United States Patent [19]

Hosaka et al.

[11] 4,209,002
[45] Jun. 24, 1980

[54] TORCH NOZZLE FOR INTERNAL COMBUSTION ENGINE

[75] Inventors: Takefumi Hosaka, Ann Arbor, Mich.; Shoichi Otaka, Kawagoe; Takao Okura, Saitama, both of Japan

[73] Assignee: Honda Giken Kogyo Kabushiki Kaisha, Tokyo, Japan

[21] Appl. No.: 877,804

[22] Filed: Feb. 15, 1978

[30] Foreign Application Priority Data

Feb. 16, 1977 [JP] Japan .................................. 52/15057

[51] Int. Cl.² ........................ F02B 19/10; F02B 19/16
[52] U.S. Cl. ........................... 123/32 SP; 123/191 SP; 123/32 C; 123/32 K
[58] Field of Search ............. 123/32 C, 32 SP, 32 ST, 123/191 S, 191 SP, 30 C, 30 D, 32 K

[56] References Cited

U.S. PATENT DOCUMENTS

| 1,365,143 | 1/1921 | Anderson | 123/169 |
| 3,919,984 | 11/1975 | Yagi et al. | 123/32 SP |
| 3,919,985 | 11/1975 | Yagi et al. | 123/32 SP |
| 4,038,952 | 8/1977 | Nagano | 123/191 SP |
| 4,114,569 | 9/1978 | Yamakawa | 123/191 S |

Primary Examiner—Ronald B. Cox
Attorney, Agent, or Firm—Lyon & Lyon

[57] ABSTRACT

An internal combustion piston engine employs a main combustion chamber supplied with a lean combustible mixture through a main intake passage and an auxiliary combustion chamber supplied with a rich combustible mixture through an auxiliary intake passage. The auxiliary combustion chamber has a spark plug associated therewith, and a torch nozzle defined by a slot having its major axis extending along the principal axis of the engine cylinder.

3 Claims, 7 Drawing Figures

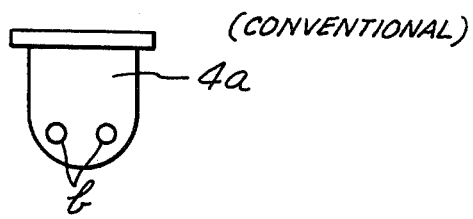
FIG. 4. (CONVENTIONAL)

TORCH NOZZLE FOR INTERNAL COMBUSTION ENGINE

The present invention relates to a combustion chamber system for internal combustion engines and more particularly, to a torch nozzle configuration communicating a main combustion chamber with an auxiliary combustion chamber.

It has heretofore been known to provide combustion chamber systems for internal combustion engines which employ a main combustion chamber having an intake valve and an exhaust valve and which is supplied through a main intake passage and the intake valve with a lean combustible mixture, and an auxiliary combustion chamber having a spark plug associated therewith which is supplied through an auxiliary intake passage with a rich combustible mixture and is communicated with the main combustion chamber through a torch nozzle. The torch nozzle is generally of the type comprising one or two small circular holes provided in a hot cup which forms the peripheral wall of the auxiliary combustion chamber. While such a system functions advantageously in the reduction of harmful components, HC, NO$_x$ and CO, in its exhaust, it would be desirable to improve its fuel consumption. To improve the fuel consumption, it has been suggested that the holes comprising the torch nozzle might be made smaller in diameter and that the torch flames injected therethrough into the main combustion chamber could be made more rapid. By such arrangement, however, the area of action of the flame is reduced and the flame quenching layer on the wall of the main combustion chamber is increased thereby further increasing the HC component in the exhaust, which, of course, is not desirable.

The object of the present invention is therefore to provide a combustion system which decreases fuel consumption while maintaining a very low level of emissions of harmful components in the exhaust. Such a system is characterized by the aforesaid main and auxiliary combustion chambers communicating through a torch nozzle which is formed as a slot. The slot is provided in the hot cup which forms the peripheral wall of the auxiliary combustion chamber. The major axis of the slot extends parallel to the principal axis of the engine cylinder below the main combustion chamber. It has been found that in such a configuration, it is desirable that the major axis of the slot be oriented approximately along the current of mixture swirl which is produced in the main combustion chamber during the compression strokes of the engine's pistons and that the angle of the nozzle's deflection, i.e., the angle formed by the direction of its orientation in reference to the line extending from the center of the auxiliary combustion chamber to the center of the main combustion chamber be approximately 15 to 30 degrees.

Other objects and advantages will appear hereinafter.

In the drawings:

FIG. 4 is a side view of a conventional torch nozzle.

Figure 1:
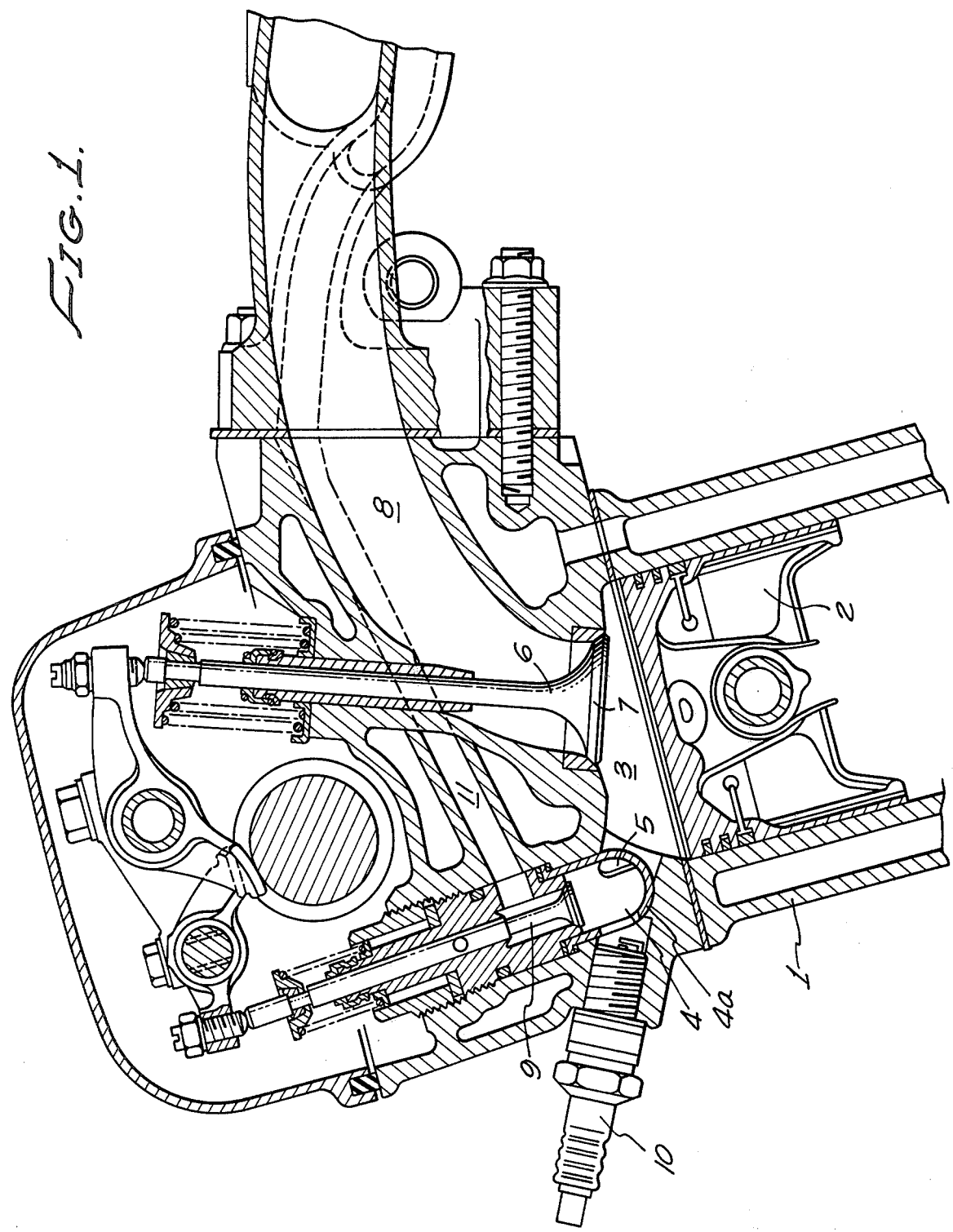
FIG. 1 is a sectional side elevation showing a preferred embodiment of this invention.

Referring now in detail to the drawings, the internal combustion engine 1 is provided with a piston 2, cylinder 2a and main combustion chamber 3 and an auxiliary combustion chamber 4. A torch nozzle 5 connects the main combustion chamber 3 and the auxiliary combustion chamber 4, the latter being provided with a spark plug 10. The peripheral wall of the auxiliary combustion chamber 4 is formed within a hot cup 4a, through which the torch nozzle 5 is provided.

The main combustion chamber 3 is further provided on its upper side with a main intake valve 6 and an exhaust valve 7 and a main intake passage 8 connected to said main intake valve 6 to an outside source for producing lean air-fuel mixture comprising, among other elements, a main carburetor. The auxiliary combustion chamber 4 is provided with an auxiliary intake valve 9 at the upper end thereof, an auxiliary intake passage 11 and a spark plug 10 disposed at the side thereof. The auxiliary intake passage 11 connects the auxiliary combustion chamber 4 to an outside source for producing rich air-fuel mixture comprising, among other elements, an auxiliary carburetor. The rich mixture supplied to the auxiliary combustion chamber 4 through intake passage 11 is ignited by the spark plug 10 to produce a flame which is injected as a torch flame through the torch nozzle 5 into the main combustion chamber 3.

Figure 2:
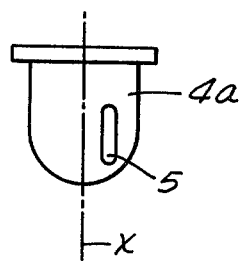
FIG. 2 is a side view of the hot cup forming the peripheral wall of the auxiliary combustion chamber with the torch nozzle of the present invention disposed therein.
Figure 3:
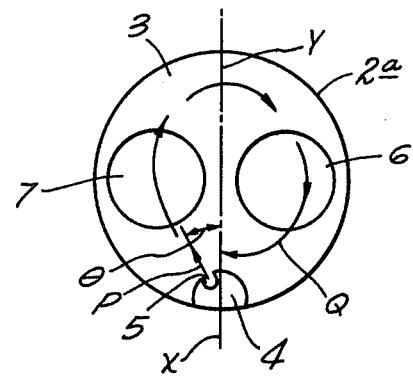
FIG. 3 is a plan view of a portion of the engine cylinder and main combustion chamber and auxiliary combustion chamber, illustrating the angle of deflection of the torch nozzle with respect thereto.

While the foregoing general description does not differ from systems heretofore known in the art (see, for example, U.S. Pat. Nos. 3,853,097 and 3,919,985), the torch nozzle 5 of the present invention, as is clearly seen in FIGS. 2 and 3, is defined by a slot in the hot cup 4a extending vertically and longitudinally along the principal axis of the engine cylinder 2a. This is marked contrast to the torch nozzle in the conventional systems heretofore available wherein one or two small circular holes b are provided in the hot cup as shown in FIG. 4. In such a system, the small holes are generally about 5.5 mm in diameter. The slot comprising the torch nozzle of the present invention is preferably about 3 mm wide and 12 mm long. The slot is oriented, as shown by the arrow P in FIG. 3, to the line of mixture swirl produced in the main combustion chamber 3 during the compression strokes of the engine's pistons, i.e., in the direction of swirling current shown by the arrow Q in the same figure. Specifically, the direction P forms an angle $\theta$ with respect to the line extending from the center X of the auxiliary combustion chamber 4 to the center Y of the main engine cylinder 2a, which angle $\theta$ is preferably within the range of 15 to 30 degrees.

By the aforesaid arrangement, when the engine is operated, flame produced in the auxiliary combustion chamber 4 is injected as a torch flame through the torch nozzle 5 into the main combustion chamber 3 to burn the lean mixture therein. Due to the configuration of the slot of the torch nozzle 5, the torch flame generally is relatively narrow in width and long in the vertical direction so that it is injected at a high speed such as would be the case if the small hole in the conventional system were reduced in diameter. However, with the slot configuration. the flame expands in the main combustion chamber 3 along the vertical direction thereby effecting improved combustion therein and improving fuel consumption. The direction of the torch flame is dictated by the orientation of the slot in the torch nozzle 5 which, as noted above, is along the direction of swirl in the main combustion chamber 3. Accordingly, the torch flame flows in the main combustion chamber 3 along its inner peripheral wall to allow the fuel components on the wall to burn for a sufficient period of time, that is, to ignite the unburned mixture in the flame quenching layer on the main combustion chamber wall which effectively reduces the amount of HC in the exhaust.

Figure 6:
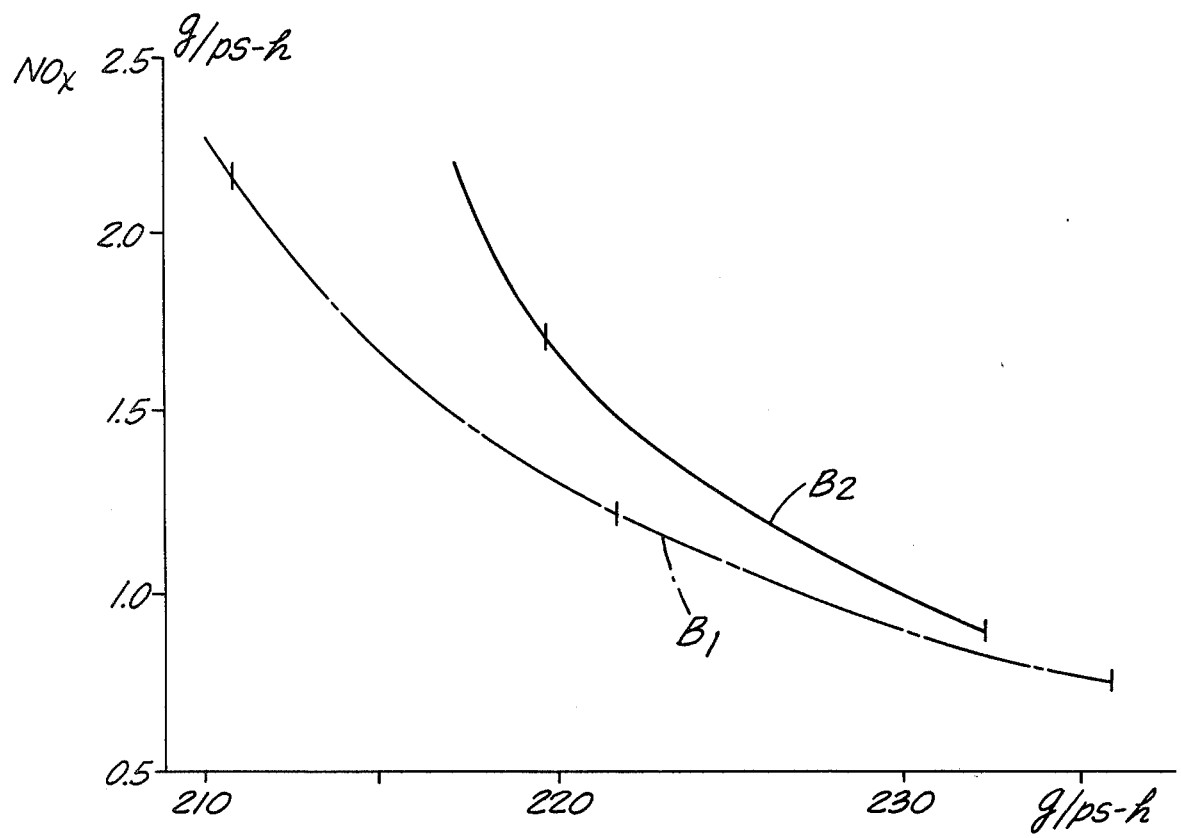
Figure 7:
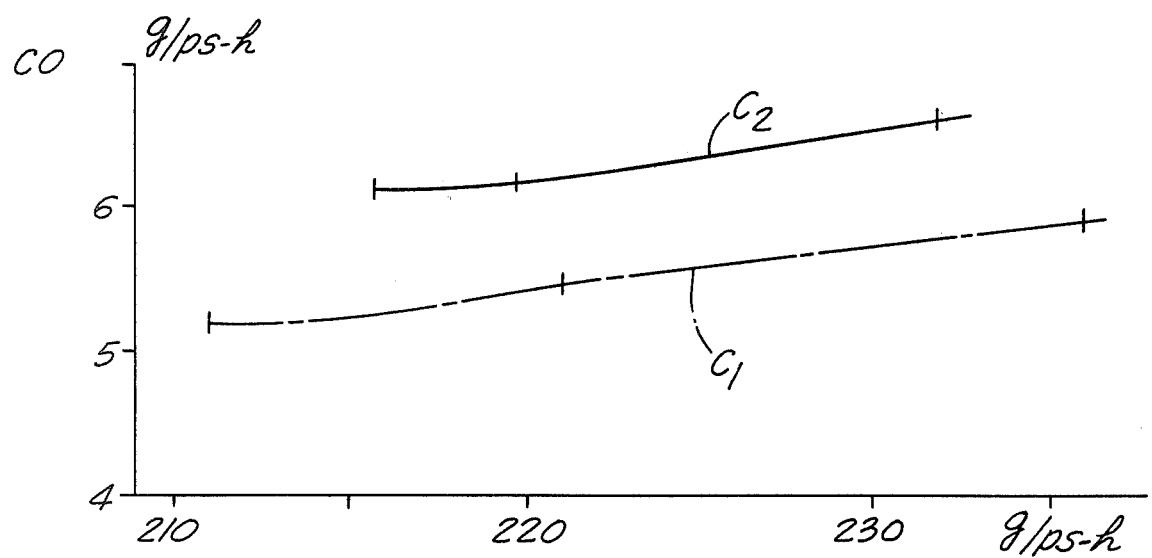

Comparative testing has been conducted between an internal combustion engine provided with the combustion chamber system of the present invention and that incorporating a conventional torch nozzle configuration such as that shown in FIG. 4. The test was conducted on a vehicle traveling at a velocity of 40 km/h at an engine speed of 1,560 RPM. The results of this testing are illustrated in FIGS. 5 through 7.

Figure 5:
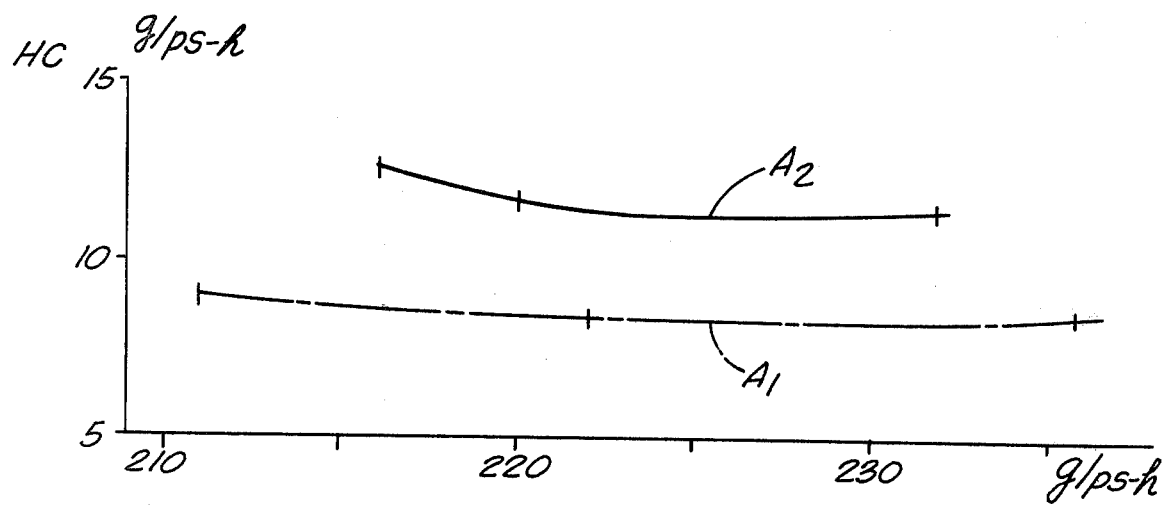
FIGS. 5 through 7 are comparative graphs illustrating the relationships between fuel consumption and exhaust emissions for internal combustion engines employing the present invention and those employing conventional combustion chamber systems.

FIG. 5 illustrates the relationship between the unburned hydrocarbons [HC] in the exhaust and fuel consumption, with $A_1$ indicating the results obtained utilizing the present invention and $A_2$ indicating the results obtained using the conventional system. FIG. 6 shows the relationship between the amount of oxides of nitrogen [$NO_X$] in the exhaust and the fuel consumption, with $B_1$ indicating the results obtained with the present invention and $B_2$ those obtained using the conventional system. FIG. 7 indicates the relationship between the amount of carbon monoxide [CO] in the exhaust and fuel consumption, with $C_1$ indicating the results obtained using the present invention and $C_2$ indicating the results obtained using the conventional system. In each figure, the fuel consumption is measured in grams per horsepower-hour [g/ps-h], which is set forth on the horizontal axis, increasing from left to right, and the amount of a particular exhaust emission is similarly indicated on the vertical axis.

As is clearly shown by the results of these tests, if the amount of each harmful component in the exhaust is assumed to be the predetermined limit value, the fuel consumption is remarkably improved by the incorporation of the present invention as contrasted with those engines provided with conventional chamber systems.

Having fully described our invention, it is to be understood that we are not to be limited to the details herein set forth but that our invention is of the full scope of the appended claims.

We claim:

1. In an internal combustion engine of the type having a main combustion chamber provided with an intake valve and an exhaust valve and being supplied through a main intake passage and said intake valve with a lean combustible mixture, an auxiliary combustion chamber having a spark plug associated therewith and being supplied through an auxiliary intake passage with a rich combustible mixture, and a torch nozzle communicating said auxiliary combustion chamber with said main combustion chamber, the improvement comprising: an elongated slot in the wall of said auxiliary combustion chamber, said slot defining said torch nozzle, the major axis of said slot extending substantially parallel to the axis of the cylinder of the engine.

2. In an internal combustion engine of the type having a main combustion chamber provided with an intake valve and an exhaust valve and being supplied through a main intake passage and said intake valve with a lean combustible mixture, an auxiliary combustion chamber having a spark plug associated therewith and being supplied through an auxiliary intake passage with a rich combustible mixture, and a torch nozzle communicating said auxiliary combustion chamber with said main combustion chamber, the improvement comprising: an elongated slot in the wall of said auxiliary combustion chamber, said slot defining said torch nozzle, the major axis of said slot extending substantially parallel to the axis of the cylinder of the engine and being angularly disposed in the direction of mixture swirl produced in said main combustion chamber during the compression stroke of said engine.

3. In an internal combustion engine of the type having a main combustion chamber provided with an intake valve and an exhaust valve and being supplied through a main intake passage and said intake valve with a lean combustible mixture, an auxiliary combustion chamber having a spark plug associated therewith and being supplied through an auxiliary intake passage with a rich combustible mixture, and a torch nozzle communicating said auxiliary combustion chamber with said main combustion chamber, the improvement comprising: an elongated slot in the wall of said auxiliary combustion chamber, said slot defining said torch nozzle, the major axis of said slot extending substantially parallel to the axis of the cylinder of the engine and being angularly disposed within the range of 15 to 30 degrees with respect to a line extending from the center of said auxiliary combustion chamber to the axis of the cylinder of the engine.

* * * * *